(12) United States Patent
Kollep et al.

(10) Patent No.: US 6,799,503 B2
(45) Date of Patent: Oct. 5, 2004

(54) DEVICE FOR EXTRACTING A SUBSTANCE

(75) Inventors: Alexandre Kollep, Lutry (CH); Alfred Yoakim, St-Legier-la-Chiesaz (CH); Antoine Cahen, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/290,241

(22) Filed: Nov. 8, 2002

(65) Prior Publication Data

US 2003/0089245 A1 May 15, 2003

Related U.S. Application Data

(63) Continuation-in-part of application No. PCT/EP01/04315, filed on Apr. 13, 2001.

(30) Foreign Application Priority Data

May 9, 2000 (EP) .............................................. 00110102

(51) Int. Cl.⁷ .............................................. A47J 31/40
(52) U.S. Cl. ..................... 99/295; 99/289 R; 99/302 R
(58) Field of Search .............................. 99/295, 289 R, 99/302 R, 289 T, 289 P, 290

(56) References Cited

U.S. PATENT DOCUMENTS

| | | | | |
|---|---|---|---|---|
| 2,283,967 A | * | 5/1942 | Brown ...................... | 99/289 R |
| 3,356,011 A | * | 12/1967 | Parraga ..................... | 99/289 R |
| 3,599,557 A | | 8/1971 | Leal .......................... | 99/302 R |
| 4,846,052 A | | 7/1989 | Favre et al. ................... | 99/295 |
| 5,134,924 A | * | 8/1992 | Vicker ......................... | 99/280 |
| 5,402,707 A | | 4/1995 | Fond et al. .................... | 99/295 |
| 5,656,316 A | | 8/1997 | Fond et al. ................. | 426/433 |
| 5,762,987 A | | 6/1998 | Fond et al. ................. | 426/433 |
| 5,826,492 A | | 10/1998 | Fond et al. .................... | 99/295 |
| 5,897,899 A | | 4/1999 | Fond .......................... | 426/112 |
| 6,025,000 A | | 2/2000 | Fond et al. ................. | 426/433 |
| 6,068,871 A | | 5/2000 | Fond et al. ................. | 426/433 |
| 6,240,832 B1 | * | 6/2001 | Schmed et al. ........... | 99/289 R |
| 6,345,570 B1 | * | 2/2002 | Santi ....................... | 99/289 R |

FOREIGN PATENT DOCUMENTS

| | | |
|---|---|---|
| DE | 196 47 039 C2 | 7/1997 |
| JP | 03123516 A | 5/1991 |
| WO | WO 00/45685 A3 | 8/2000 |
| WO | WO 00/49926 A1 | 8/2000 |

* cited by examiner

*Primary Examiner*—Reginald L. Alexander
(74) *Attorney, Agent, or Firm*—Winston & Strawn LLP

(57) ABSTRACT

The present invention relates to a device for extracting a substance for the preparation of a drink from a cartridge. This device has a frame with a base, a vertical part on the base and a horizontal part situated at a certain distance from the base. The device also has a moveable drawer that is able to slide over the horizontal part of the frame in order to move the cartridge from its insertion position to a drink-preparing position. This drawer moves over a system of elements for the discharge of the drink on the horizontal part. The device also includes a cartridge extraction system situated over the system of drink discharge elements and able to move towards the said system of elements to trap and extract the cartridge.

26 Claims, 5 Drawing Sheets

DEVICE FOR EXTRACTING A SUBSTANCE

CROSS-REFERENCE TO RELATED APPLICATIONS

This application is a continuation-in-part of the U.S. National phase designation of International application PCT/EP01/04315 filed Apr. 13, 2001, the content of which is hereby expressly incorporated herein by reference thereto.

FIELD OF THE INVENTION

The present invention relates to a device for extracting a substance for the preparation of a drink from a cartridge. More particularly, the invention relates to a device for sequentially preparing a plurality of beverages.

BACKGROUND ART

A device for extracting a substance for the preparation of a drink is known, as disclosed in U.S. Pat. No. 5,402,707, which relates to a system for the extraction of sealed cartridges. The problem with this system is that the consumer has to stay by the machine throughout in order to stop the extraction, remove the used cartridge and insert a fresh cartridge for a second cup of coffee.

SUMMARY OF THE INVENTION

The present invention provides a device for extracting cartridges, from which it is possible to obtain two drinks without the consumer having to take any action. The present invention relates to a food preparation unit, which is preferably a beverage preparation machine. The preferred embodiment includes an extractor that is configured for sequentially receiving first and second cartridges that contain a substance and extracting a mixture of the substance and a liquid therefrom to provide a food product. A cartridge handler is configured for receiving the cartridges and sequentially moving the cartridges to the extractor. The cartridge handler also is configured for receiving the second cartridge when a first cartridge is received in the extractor.

In this embodiment, the cartridge handler includes a cartridge ejector configured for ejecting each cartridge from the extractor after the extraction. The cartridge ejector can be tiltable for sliding each cartridge away from the extractor after the extraction, preferably to a discard area located on the opposite side of a divider that separates this area from a cup receiving area. The cup receiving area is dimensioned to receive at least one cup to be filled with the food product.

The cartridge handler preferably comprises a receiving portion that is configured for permitting a user to place the first cartridge therein, and the second cartridge therein when the first cartridge is received in the extractor. The cartridge handler is also preferably configured for moving the cartridges from the receiving portion to the extractor. In a preferred embodiment, the cartridge handler comprises a drawer that is movable with respect to the extractor for moving the cartridges to the extractor. The drawer can be supported by a support of the unit and may be translatable with respect to the support, such as generally horizontally. A contacting surface is preferably positioned on the cartridge handler and is configured for contacting at least the second cartridge and having a concave arcuate shape generally corresponding to the second cartridge for moving the second cartridge.

The preferred extractor includes first and second extractor portions that define an extraction chamber therebetween for receiving each cartridge. The first and second portions are movable relative to each other for opening and closing the extraction chamber. The first extractor portion preferably comprises a threaded member, and the unit further comprises an extractor actuator that is threadably associated with the first extractor portion for moving the first extractor portion towards and away from the second extractor portion to open and close the extraction chamber. The threaded member is preferably a threaded shaft that is movable along a substantially straight path for opening and closing the chamber, and the extraction chamber can be disposed substantially coaxially and also within the threaded member.

A discharge conduit of the unit includes a discharge channel, which is in fluid communication with the extractor. The discharge channel is positionable, such as by rotation, in first and second positions for discharging the food from the channel selectively to a first or second location when in said first and second positions, respectively.

The unit preferably has an actuator operatively associated with at least one of the cartridge handler, the extractor, and the discharge conduit. The actuator may include separate actuators, such as motors, to operate each of these elements. Preferably, electronics of the unit control the operation of the actuators. For example, the actuators and the electronics are preferably configured moving the discharge channel from the first position to the second position between extraction of the of the mixture from the first and second cartridges, or from one position to the other after an extraction takes place.

The preferred beverage preparation unit includes a support on which the extractor, cartridge handler, and discharge channel are mounted. The support defines a cup receiving space configured for receiving first and second cups simultaneously positioned at the first and second locations, respectively. A liquid inlet is associated with the extraction cavity for feeding the liquid into the extraction cavity. Additionally, an injector is associated with the liquid inlet and extraction cavity and configured for injecting the liquid into the capsule.

The present invention provides a food preparation machine that enables a user to prepare more than one serving of a food product without having to wait until the first serving is complete.

BRIEF DESCRIPTION OF THE DRAWINGS

The balance of the description is given with reference to the drawing figures, in which.

DETAILED DESCRIPTION OF THE PREFERRED EMBODIMENTS

Figure 1:
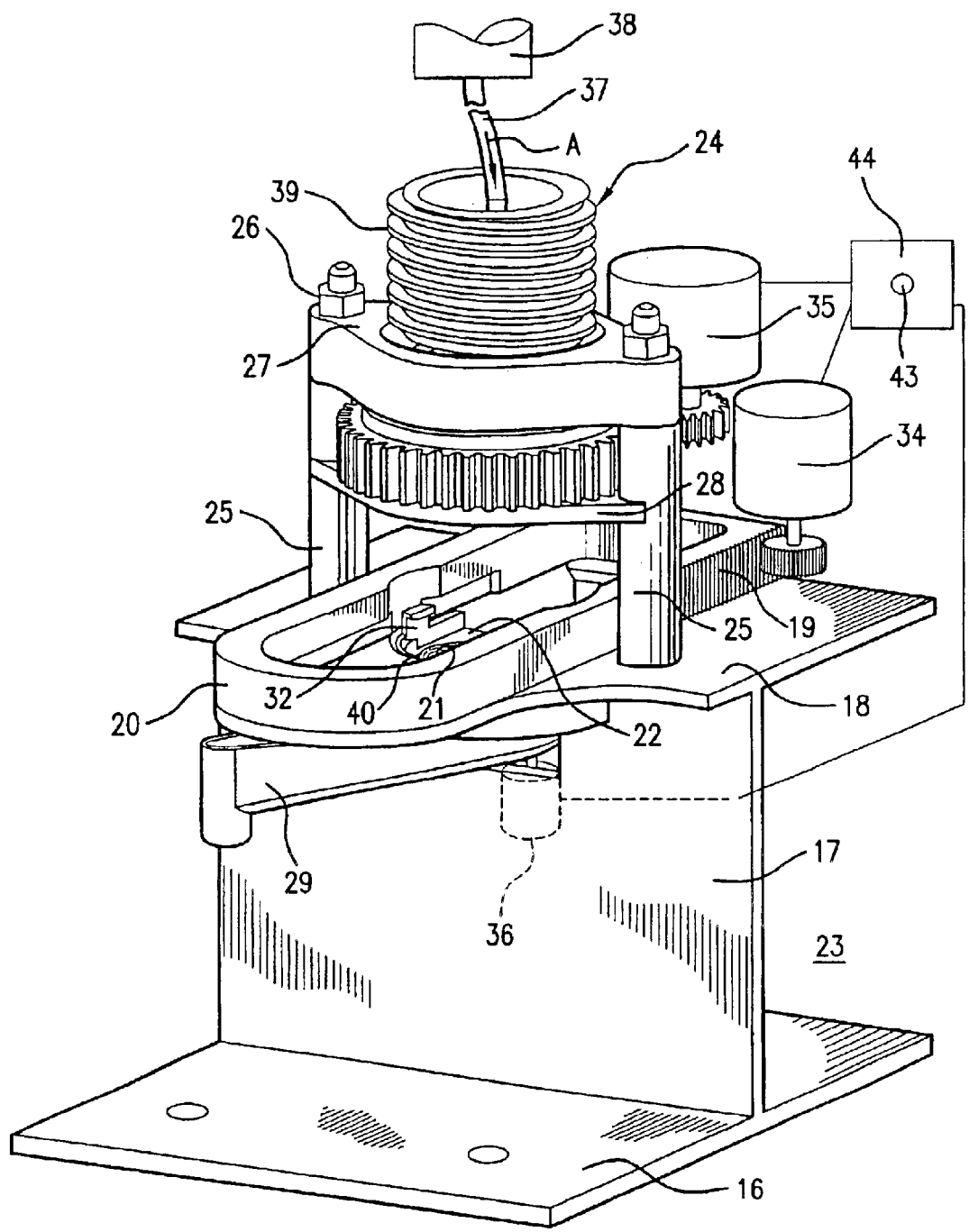
FIG. 1 is an illustration of the device according to the invention in perspective, shown empty.

The present invention relates to a device for extracting a substance, in which the consumer places the first cartridge to be extracted, immediately followed by the second cartridge to be extracted, and can then leave the machine to automatically prepare both drinks. This device is very useful in offices, in the home and anywhere where the user has to deal with other tasks during the extraction, as for example in cafes, hotels, restaurants, and so forth.

The present invention relates to a device for extracting a substance for the preparation of a drink from a cartridge, comprising a support that includes a frame with a base, and preferably a vertical part on the base and a horizontal part situated at a certain distance from the base. A moveable cartridge handler, such as a drawer is able to slide over the horizontal part of the frame in order to move the cartridge from its insertion position in a cartridge receiving portion of the cartridge handler to a drink-preparing position over a system of elements for the discharge of the said drink on the said horizontal part and a cartridge extraction system situated over the system of drink discharge elements and able to move towards the said system of elements to trap and extract the cartridge.

It is possible in the device according to the invention to extract sealed cartridges, such as those disclosed in U.S. Pat. Nos. 5,897,899 and 6,025,000, and including capsules and sachets. It is also possible to use the device according to the invention for open cartridges, such as plastic cartridges or filter-paper sachets made of nonwoven materials.

The substance contained in the sealed, open or other cartridge is a powder substance for the preparation of a drink. This substance is preferably roasted ground coffee, but can also be tea, instant coffee, a blend of ground coffee and instant coffee, a chocolate-based product or any other dehydrated substance suitable for consumption.

The distance between the base and the horizontal part of the frame is approximately slightly greater than the height of the cup into which the coffee will be poured.

The moveable drawer of the device comprises a part shaped like an arc of a circle and, when the said drawer moves, moves the cartridge into the position in which it will be extracted. The drawer moves back to pull the cartridge and immediately returns to its initial position, allowing another cartridge to be inserted at once.

The extraction system utilized may be for example that forming the subject matter of U.S. Pat. No. 4,846,052. If the device according to the invention is used for extracting sealed cartridges, the drink discharge elements are preferably in the form of a plate with relief and recessed elements, such as those disclosed in U.S. Pat. Nos. 5,402,707 and 5,762,987.

The cartridge extraction system is supported by two vertical support portions, preferably on the horizontal part of the frame and external to the moveable drawer. The guides can be held in position by a system of bolts.

A system of drink discharge elements is part of an ejector for expelling used cartridges at the rear of the device that is actuated when the extraction system rises.

The preferred extraction system includes a cartridge cage, for example that forming the subject-matter of U.S. Pat. No. 4,846,052, mentioned above, which is moved towards the drink discharge elements by a piston. This piston is driven by a motor.

As indicated above, the device according to the invention is capable of making two cups of coffee one after the other. In another embodiment, more than two cups can be made. For this purpose there is provided, beneath and downstream of the drink discharge elements, a discharge channel with at least two positions for filling two cups in succession. This discharge channel is driven by a motor.

As shown in FIG. 1, there are preferably three or at least three motors in the unit: a motor (34) for moving the drawer, a motor (35) for raising and lowering the cartridge extraction system, and a motor (36) for the discharge channel.

The support frame of the preferred embodiment comprises a base (16), a vertical part (17) and a horizontal part (18). A moveable drawer (19) is situated on the abovementioned horizontal part. This drawer comprises a front part (20) in the shape of an arc of a circle. The horizontal part comprises a system of elements (21) in relief and including drainage openings for discharging the drink, which system can be part of an ejector (22) for expelling extracted cartridges at the rear (23) of the machine. The extraction system (24) with an extractor of the embodiment shown is supported by two vertical guides (25), held in position by bolts (26), and includes a hot-water inlet (37) as indicated at arrow A. The hot water inlet is preferably connected to a hot water supply (38). Elements (27) and (28) guide the extraction system (24) and keep it in position and its portions (39,40) aligned for mating when they close. A discharge conduit with a discharge channel (29) conveys the coffee into the cup (30) from the extraction system.

Figure 5:
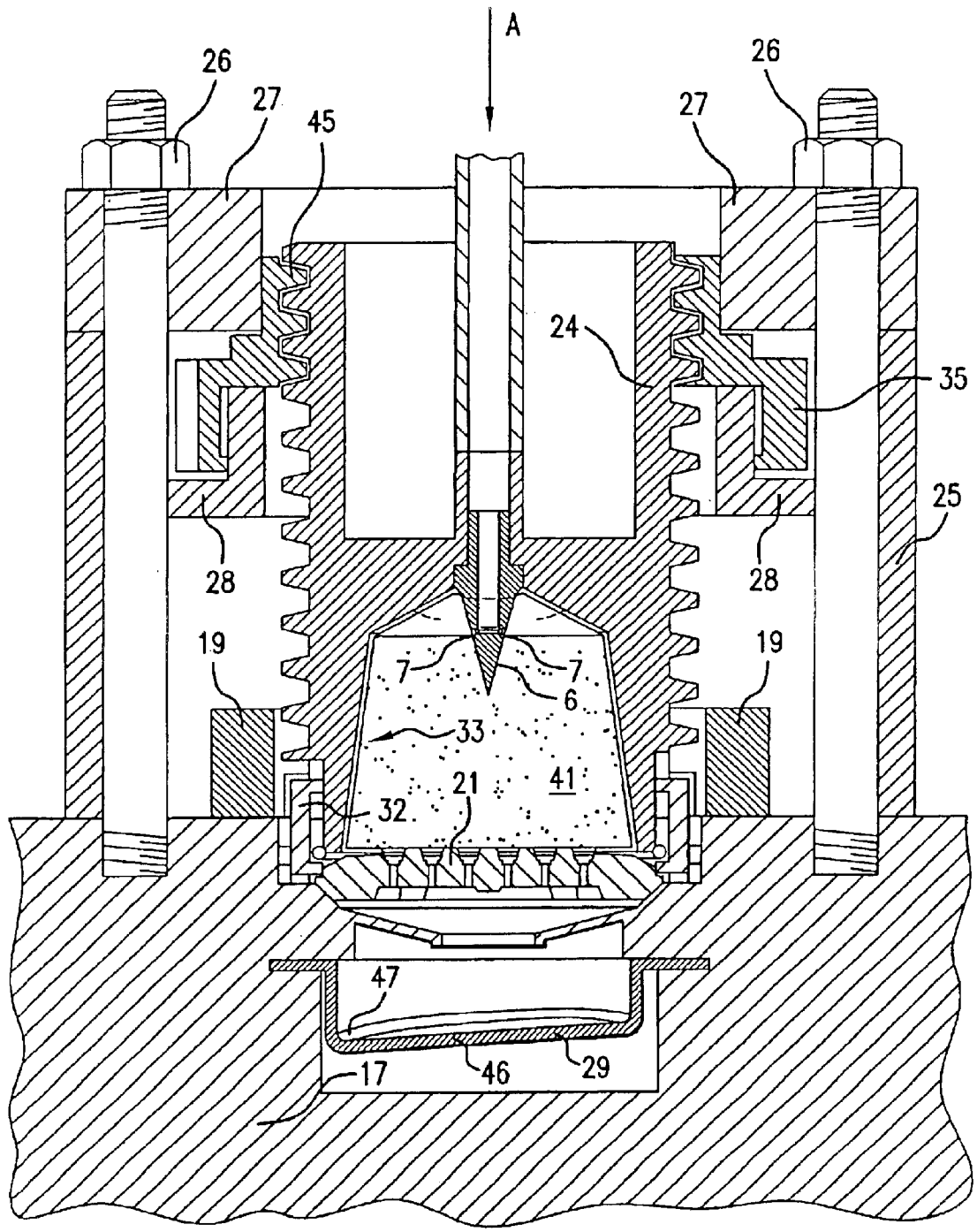
FIG. 5 is an illustration in cross section of the extraction system taken on V—V as marked in FIG. 3.

FIG. 5 shows a section through the device according to the invention during the extraction of the cartridge (33). The extraction system comprises a cartridge cage (8) containing the cartridge (33). The hot water from A arrives via the injection member (6), which has at least one hole, and preferably two holes (7), and enters the cartridge (33), which contains a food substance (41). The gearwheel (35) is driven by motor (35) and enables the extraction system (24) to be lowered and raised. The hook (32) is for removing the used cartridge from the cartridge cage (8).

The device according to the invention works as follows: FIG. 1 shows the device when empty with no cartridge, the extraction system (24) raised and the moveable drawer (19) in the forward position to permit a user to place a first cartridge therein. The ejector (22) comprises a drive that tips the ejector back to expel the used cartridge. The ejector drive may be connected, for instance, to the portion 39 of the ejector to automatically eject the cartridges after extraction. The water inlet is indicated by the arrow A.

Figure 2:
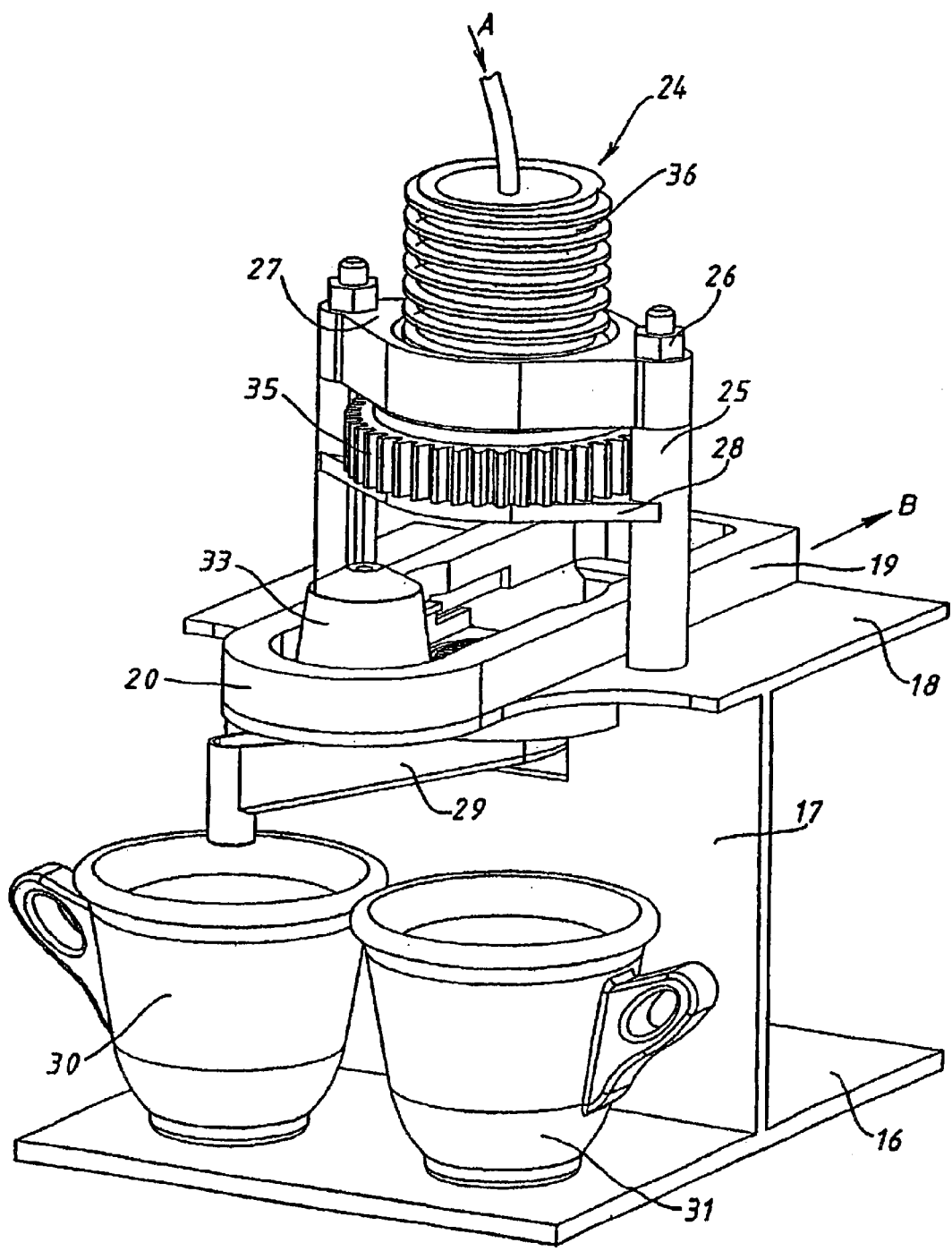
FIG. 2 is an illustration similar to that of FIG. 1 with a cartridge to be extracted.
Figure 3:
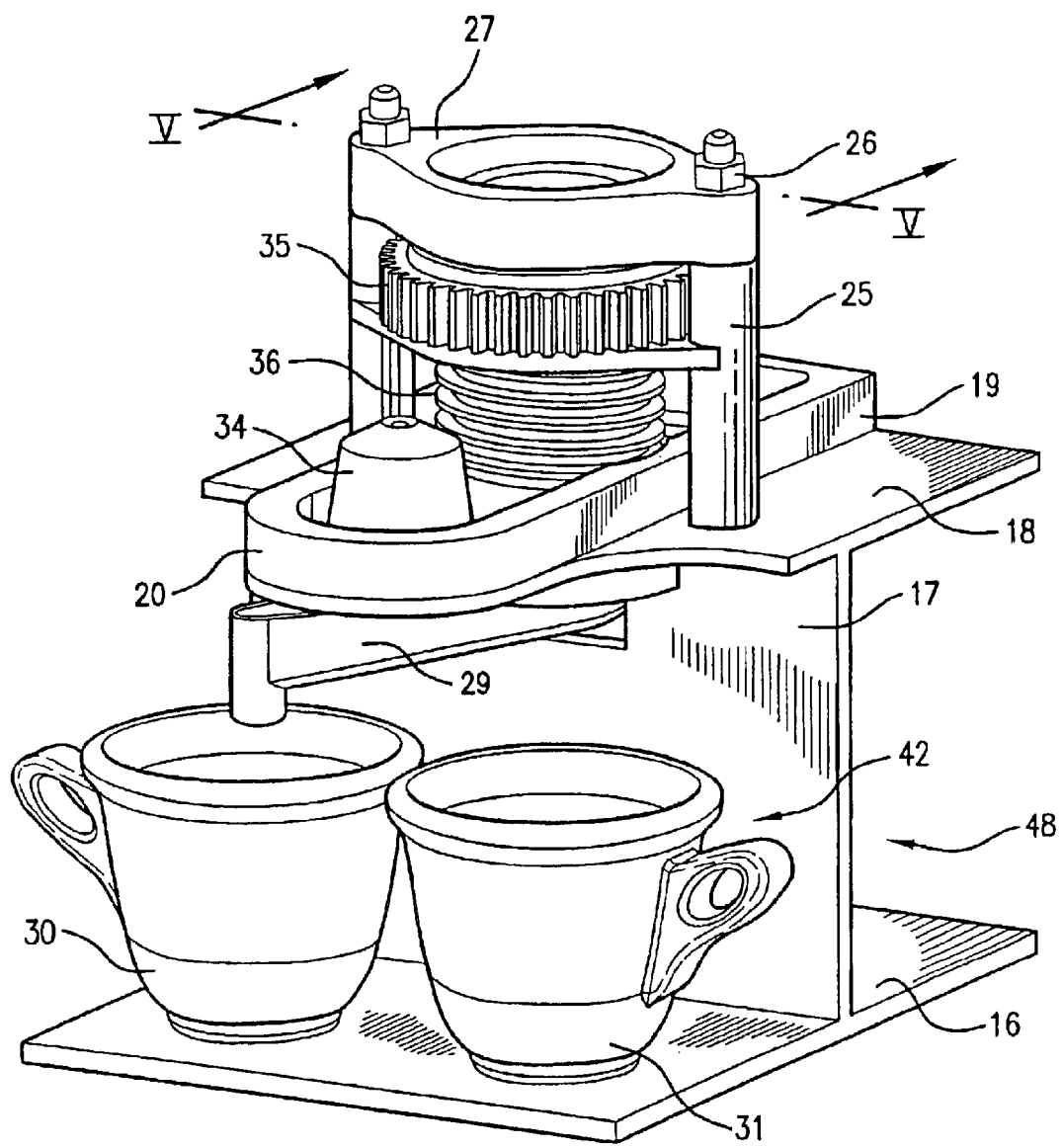
FIG. 3 is an illustration of the device in operation.

FIG. 2 shows the two cups (30) and (31) underneath the discharge channel (29) in a cup receiving area (42), and the cartridge to be extracted (33) is positioned in the moveable drawer (19) at the front end (20) that is shaped as an arc of a circle. The consumer wishes to prepare a cup of coffee and presses the button (43) of the machine, which is connected to electronics (44) that operates the motors (34–36) and the flow of water from the inlet (37), such as by controlling a pump or a valve, to start the preparation of the first cup of coffee. The signal to start is electronically transmitted and the moveable drawer moves in the direction of arrow B, taking the cartridge (33) onto the system (21) of drink discharge elements. The moveable drawer (19) then returns to its initial position and the consumer can insert the second cartridge (34) to be extracted (FIG. 3). When the first cartridge (33) is in position, motor (35) turns the gearwheel (35) which, via an internal thread (45), engages with the piston (36) of the extraction system (24) and lowers the said extraction system to the position shown in FIG. 3, thus creating a good seal between the portions (39,40) of the extractor for extraction purposes. The hot water then arrives in the direction indicated by A and enters the cartridge (33), and pressure causes the bottom face of the cartridge to open against the system of elements (21), so that the coffee discharges through the discharge channel (29) into the cup (30). As shown in FIG. 5, the discharge channel (29) has an inclined bottom (46) to direct the discharged beverage to lowest portion (47) of the channel, which may be offset to one lateral side thereof.

Figure 4:
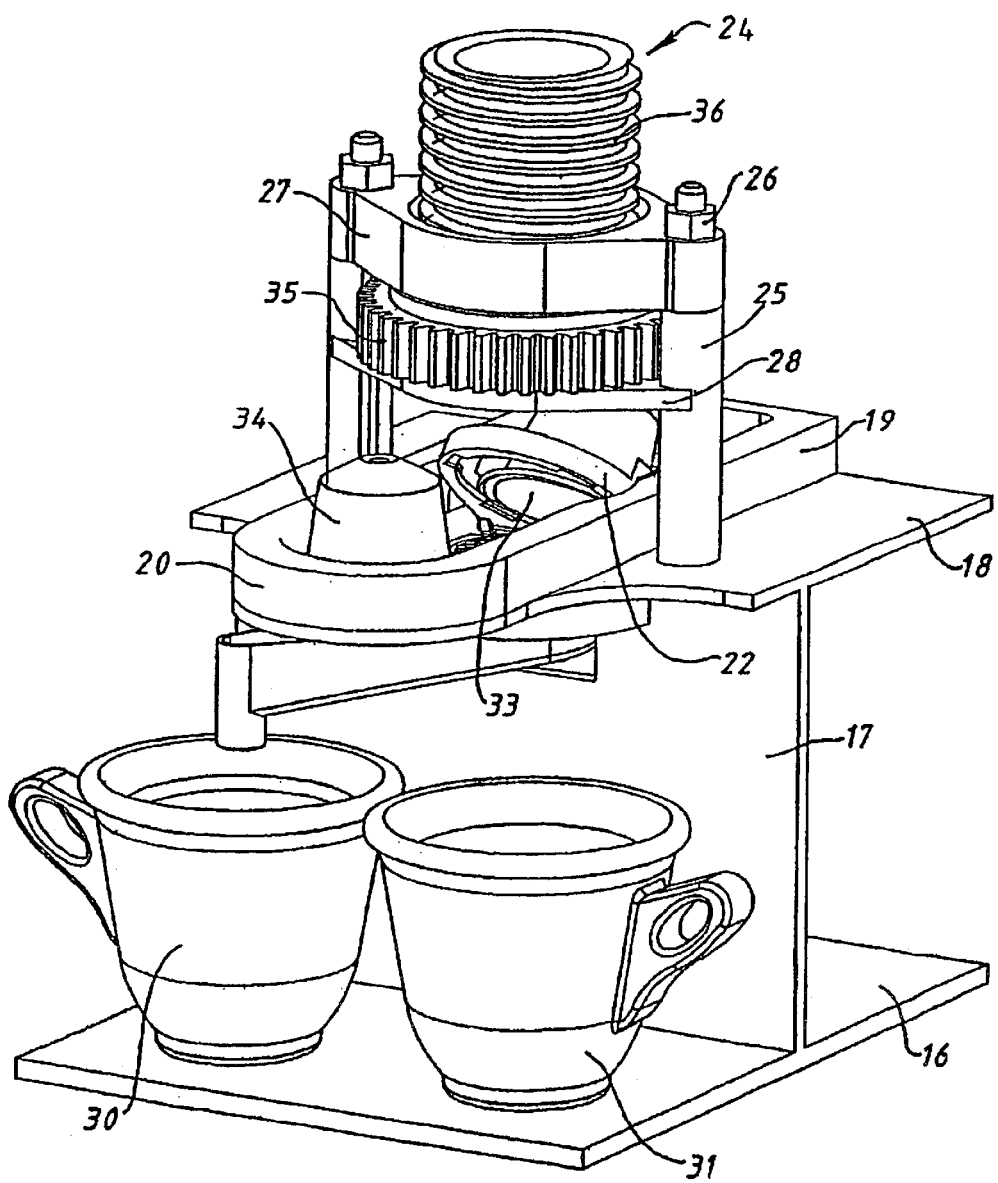
FIG. 4 is an illustration of the device following extraction.

When extraction is complete, motor (35) raises the extraction system (24), which preferably raises the hook (32) to activate the ejector (22) to remove the extracted/used cartridge from the capsule cage by tipping and sliding the cartridge (33) towards the rear of the machine (FIG. 4) to a discard area (48) on an opposite side of dividing wall (17) from the cup receiving area (42). The machine is now once again in the position shown in FIG. 2, but with cartridge (34) ready to be extracted. Motor (36) now moves the discharge channel (29) into position for filling the cup (31). The extraction follows the same steps as for the extraction of the cartridge (33).

After having inserted the cartridge (33), shortly thereafter followed by the cartridge (34), the consumer can leave the machine to carry out the two extraction operations. A few minutes later he returns and finds two cups of coffee ready. He can then recommence the procedure for two more cups of coffee.

While illustrative embodiments of the invention are disclosed herein, it will be appreciated that numerous modifications and other embodiments may be devised by those skilled in the art. For example, while the preferred serving size of the beverage produced is for an individual consumer, such as about a cup or an espresso cup, other embodiments have other sizes. Therefore, it will be understood that the appended claims are intended to cover all such modifications and embodiments that come within the spirit and scope of the present invention.

What is claimed is:

1. A food preparation unit, comprising:
   an extractor configured for sequentially receiving first and second cartridges that contain a substance and extracting a mixture of the substance and a liquid therefrom to provide a food product; and
   a cartridge handler comprising a drawer configured for receiving the cartridges and being movable with respect to the extractor for sequentially moving the cartridges to the extractor, wherein the cartridge handler is configured for receiving the second cartridge when a first cartridge is received in the extractor.

2. The unit of claim 1, wherein the cartridge handler comprises a cartridge ejector configured for ejecting each cartridge from the extractor after the extraction.

3. The unit of claim 2, wherein the cartridge ejector is tiltable for sliding each cartridge away from the extractor after the extraction.

4. The unit of claim 2, further comprising a divider that separates a cup receiving area that is dimensioned to receive at least one cup to be filled with the food product, from a discard area disposed on the side of the divider opposite from the cup receiving area, wherein the cartridge ejector is configured for ejecting each cartridge after the extraction to the discard area.

5. The unit of claim 1, wherein the cartridge handler comprises a receiving portion that is configured for permitting a user to place the second cartridge directly therein with the first cartridge received in the extractor, the cartridge handler being configured for moving the second cartridge from the receiving portion to the extractor.

6. The unit of claim 1, further comprising a support that is supportively associated with the drawer and extractor, wherein the drawer is translatable generally horizontally with respect to the support.

7. The unit of claim 1, wherein the cartridge handler comprises a contacting surface positioned and configured for contacting at least the second cartridge and having a concave arcuate shape generally corresponding to the second cartridge for moving the second cartridge.

8. The unit of claim 1, further comprising an actuator operatively associated with at least one of the cartridge handler and the extractor.

9. The unit of claim 8, wherein the actuator comprises an extractor actuator operatively associated with the extractor, and a handler actuator operatively associated with the cartridge handler, the unit further comprising electronics associated with the actuators for controlling the operation thereof.

10. The unit of claim 1, wherein the unit is a beverage machine further comprising:
    a discharge conduit comprising a discharge channel in fluid communication with the extractor and positionable in first and second positions for discharging the food from the channel selectively to a first or second location when in said first and second positions, respectively;
    a liquid inlet associated with the extraction cavity for feeding the liquid into the extraction cavity; and
    an injector associated with the liquid inlet and extraction cavity and configured for injecting the liquid into the capsule.

11. The unit of claim 1, wherein the extractor comprises first and second extractor portions defining an extraction chamber therebetween for receiving each cartridge, the first and second portions being movable relative to each other for opening and closing the extraction chamber.

12. The unit of claim 11, wherein the first extractor portion comprises a threaded member, and the unit further comprises an extractor actuator that is threadably associated with the first extractor portion for moving the first extractor portion towards and away from the second extractor portion to open and close the extraction chamber.

13. The unit of claim 12, wherein first extractor portion is movable along a substantially straight path for opening and closing the chamber.

14. A food preparation unit, comprising:
    an extractor configured for sequentially receiving first and second cartridges that contain a substance and extracting a mixture of the substance and a liquid therefrom to provide a food product;
    a cartridge handler configured for receiving the cartridges and sequentially moving the cartridges to the extractor, wherein the cartridge handler is configured for receiving the second cartridge when a first cartridge is received in the extractor; and
    a discharge conduit comprising a discharge channel in fluid communication with the extractor and positionable in first and second positions for discharging the food from the channel selectively to a first or second location when in said first and second positions, respectively.

15. The unit of claim 14, further comprising a discharge actuator operatively associated with the discharge channel for positioning the channel alternately in the first and second position.

16. The unit of claim 15, wherein the discharge actuator is associated with the cartridge handler and the extractor and configured for moving the discharge channel from the first position to the second position between extraction of the of the mixture from the first and second cartridges.

17. The unit of claim 14, further comprising a unit actuator that comprises the discharge actuator and is operatively associated for driving the at least one of the extractor and cartridge handler.

18. The unit of claim 14, wherein the discharge channel is rotatable between the first and second positions.

19. The unit of claim 14, further comprising a support on which the extractor, cartridge handler, and discharge channel are mounted, the support defining a cup receiving space configured for receiving first and second cups simultaneously positioned at the first and second locations, respectively.

20. A food preparation unit, comprising:

an extractor configured for sequentially receiving first and second cartridges that contain a substance and extracting a mixture of the substance and a liquid therefrom to provide a food product; and a cartridge handler configured for receiving the cartridges and sequentially moving the cartridges to the extractor, wherein the cartridge handler is configured for receiving the second cartridge when a first cartridge is received in the extractor, the cartridge handler comprising a receiving portion that is configured for permitting a user to place the second cartridge directly therein with the first cartridge received in the extractor, the cartridge handler being configured for moving the second cartridge from the receiving portion to the extractor.

21. The unit of claim 20, wherein the first and second cartridges are of separate construction from each other.

22. The unit of claim 21, wherein the first and second cartridges each contain an individual serving.

23. The unit of claim 20, wherein the receiving portion is configured for receiving the first cartridge, and the cartridge handler is configured for moving the first cartridge to the extractor for the extraction.

24. A food preparation unit, comprising:

a cartridge handler comprising a drawer configured for receiving first and second a cartridges containing a substance, the drawer being movable for moving the cartridges to an extraction location;

an extractor comprising a first extractor portion configured for moving downwardly to sequentially receive and trap the cartridges in the extraction location for extracting from the cartridges a mixture of the substance and a liquid to provide a food product, wherein the drawer is configured for receiving the second cartridge when a first cartridge is received in the extractor;

a discard portion with a discard area for receiving extracted cartridges; and a cartridge ejector configured for ejecting each cartridge from the extractor into the discard area after the extraction upon upward movement of the extractor.

25. The unit of claim 24, wherein the drawer is configured for moving the second cartridge to the extraction location upon discarding of the first cartridge by the cartridge ejector.

26. A food preparation unit, comprising:

a cartridge handler comprising a drawer configured for receiving a cartridge that contains a substance and being movable for moving the cartridge to an extraction location;

an extractor comprising a first extractor portion configured for moving downwardly to receive and trap the cartridges in the extraction location for extracting from the cartridge a mixture of the substance and a liquid to provide a food product, wherein the extractor comprises a second extractor portion, the first and second extractor portions defining an extraction chamber therebetween for trapping the cartridge, the first and second portions being movable relative to each other for opening and closing the extraction chamber, the first extractor portion comprising a threaded member, and the unit further comprising an extractor actuator that is threadably associated with the first extractor portion for moving the first extractor portion downwards towards and upwards away from the second extractor portion to open and close the extraction chamber;

a discard portion with a discard area for receiving extracted cartridges; and a cartridge ejector configured for ejecting each cartridge from the extractor into the discard area after the extraction upon upward movement of the extractor.

* * * * *